United States Patent [19]

Esmay

[11] 3,993,833

[45] Nov. 23, 1976

[54] POLYURETHANE FOAM-BACKED PRESSURE-SENSITIVE ADHESIVE TAPE

[75] Inventor: Donald L. Esmay, Coon Rapids, Minn.

[73] Assignee: Minnesota Mining and Manufacturing Company, St. Paul, Minn.

[22] Filed: Jan. 19, 1976

[21] Appl. No.: 650,149

[52] U.S. Cl. .......................... 428/311; 260/2.5 AG; 260/2.5 AD; 260/2.5 AL; 428/315; 428/351; 428/425
[51] Int. Cl.² .......................................... B32B 3/26
[58] Field of Search ................ 260/2.5 AD, 2.5 AK, 260/2.5 BE, 2.5 AG, 2.5 AL; 428/311, 310, 315, 351, 425

[56] References Cited
UNITED STATES PATENTS

| | | |
|---|---|---|
| 3,173,826 | 3/1965 | Campbell et al. .................... 428/310 |
| 3,311,338 | 3/1967 | Culley ................................ 428/315 |
| 3,524,825 | 8/1970 | Rill, Jr. ............................. 428/425 |

*Primary Examiner*—William J. Van Balen
*Attorney, Agent, or Firm*—Alexander, Sell, Steldt & DeLaHunt

[57] ABSTRACT

Foam-backed pressure-sensitive adhesive tape having an open-cell polyurethane foam backing containing a foam-stabilizing fluoroaliphatic substance such as a fluoroaliphatic oligomer which affords repellency to oil and water. Moieties of the fluoroaliphatic substance similar to moieties of the polyurethane afford solubility in the polyurethane-forming mixture which is balanced against the insolubilizing effect of the carbon-bonded fluorine to concentrate the fluoroaliphatic substance at the cell membrane surfaces of the foam.

14 Claims, No Drawings

POLYURETHANE FOAM-BACKED PRESSURE-SENSITIVE ADHESIVE TAPE

BACKGROUND OF THE INVENTION

Foam-backed pressure-sensitive adhesive tapes are used in a wide variety of applications. Some such tapes have a pressure-sensitive adhesive layer on each surface and may be used for mounting objects such as pictures on walls or plastic body side molding on automobiles. Other such tapes have only one adhesive layer. For example, a single-adhesive layer may function to position the foam backing as a cushioning gasket for an automobile window which is sealed by fastening a metal strip to the window frame. Most such applications require the foam backing to have both good compressibility and good resilience. For good compressibility, the foam should have an open-cell structure.

The backing of one such pressure-sensitive adhesive tape is a polyurethane foam, as disclosed in Canadian Pat. No. 747,341, but polyurethane foams tend to swell excessively in contact with oils such as gasoline, especially when of open-cell structure. Open-cell polyurethane foams tend to wick both gasoline and water and, in automotive use, may carry such liquids into the interior of the vehicle. Hence, tapes of the Canadian patent have been put to little or no exterior automotive use.

Vinyl foams have rather good resistance to gasoline and water and are used as backings in pressure-sensitive adhesive tapes for automotive use even though they tend to be of closed-cell structure and hence of limited compressibility. However, the plasticizers which are essential to their compressibility and resilience tend to migrate into the adhesive layers, eventually rendering them soft and pasty and destroying their holding power. The plasticizer migration problem becomes especially severe if the plasticizer level is increased in an effort to improve the limited compressibility of the foam.

Neoprene foams also offer good resistance to gasoline and water, but pressure-sensitive adhesive tapes made therewith are relatively expensive. These tend to have closed-cell structure so that it is difficult to attain the degree of compressibility which is generally desired for automotive applications.

Polyethylene foams are less expensive but also tend to have poor compressibility due to closed-cell structure. They exhibit less resistance to heat than do the aforementioned foams.

OTHER PRIOR ART

Because fluorochemicals are known to impart repellency to water, gasoline and other oils, it might be hypothesized that they could be used to improve the resistance of polyurethane foams to gasoline and water and thus permit them to be used as pressure-sensitive adhesive tape backings for automotive use. In U.S. Pat. No. 3,880,782 (Rambosek), certain fluorochemicals are used as foam stabilizers for polyurethane foams. The resultant foams are more readily adhered to common adhesives than when silicone surfactants are used as the foam stabilizers. However, the foams described in the patent do not effectively repel gasoline and water. If the proportion of fluorochemicals used in the patent were increased in an effort to improve such repellency, the foam structure would be degraded.

U.S. Pat. No. 3,906,027 (Meussdoerffer et al.) also discloses fluorochemicals useful as foam stabilizers for polyurethane foams.

THE PRESENT INVENTION

The present invention fills the need for a foambacked pressure-sensitive adhesive tape which is inexpensive, has good compressibility and resilience, is repellent to gasoline and water, and will remain firmly adhered to substrates to which it is applied. These accomplishments are attained by employing as the foam backing a compressible, resilient, open-cell polyurethane foam incorporating a foamstabilizing fluoroaliphatic substance containing covalently bonded (a) a plurality of fluoroaliphatic radicals and (b) at least one solubilizing moiety, viz., a moiety similar in structure to a moiety of the polyurethane in order to provide a degree of solubility in the foamable polyurethane-forming mixture. For the same reason, the number average molecular weight of any polymeric component of the fluoroaliphatic substance should be about 25,000 or less.

The fluoroaliphatic substance should have limited solubility in the foamable mixture, and by virtue of this, tend to be concentrated at the cell membrane surfaces. Because of such concentration, as little as 0.02 part of the fluoroaliphatic substance per 100 parts by weight of foam can provide significant repellency to gasoline and water. The desired degree of solubility may be realized by balancing in the fluoroaliphatic substance the anti-solubilizing effect of increased fluorine content and increased molecular weight against the solubilizing effect of the moieties which are similar in structure to moieties of the polyurethane. For example, for use with a polyether polyurethane, the solubilizing moieties of the fluoroaliphatic substance may be repeating oxyalkylene units having on the average 2.5 to 4 carbon atoms. For use with a polyester polyurethane, the solubilizing moieties may be polyester groups. For use with any of the polyether, polyester or polyether-polyester polyurethanes, the solubilizing moieties may comprise urethane linkages, —OC(O)NH—. Such solubilizing moieties may provide 5 to 40, preferably 10 to 20, weight percent of the fluoroaliphatic substance.

The fluoroaliphatic substance should be free of functional groups containing active hydrogen atoms. The term "active hydrogen atom" means a hydrogen atom (other than an amido hydrogen atom) which is reactive with a Grignard reagent, as described in J. Am. Chem. Soc., 49, 3181 (1927). The desired repellency to gasoline and water can be attained with the fluoroaliphatic substance comprising 10–45 weight percent carbon-bonded fluorine. At fluorine contents approaching 45 weight percent, it is preferred that the solubilizing moieties provide about 20 percent of the fluoroaliphatic substance. For optimum all-around properties including good repellency to gasoline and water, the fluorine content should provide about 20–40 weight percent and solubilizing moieties should provide about 10–25 weight percent of the fluoroaliphatic substance.

Although the fluoroaliphatic substance acts as a foam stabilizer in the foaming of the polyurethane, 0.02 weight percent of the fluoroaliphatic substance may be insufficient to yield the desired open-cell structure unless some other foam stabilizer is also present. For examaple, silicone surfactants which are known to enhance the formation of open-cell polyurethane foam may be included in the foaming composition. When the foaming polyurethane composition comprises about 0.1–10 weight percent of the fluoroaliphatic substance, the desired open-cell structure can generally be attained without any other foam stabilizer. More than about two weight percent would tend to be uneconomical.

By "open-cell" is meant a foam providing a water take-up of at least 60 percent of the internal free volume (ASTM D 1056-73). For optimum compressibility and resilience, the interior of the foam should have about 8 to 40 cells per linear centimeter. By "compressible" and "resilient" is meant a foam which has compressibility under 2 N/cm$^2$ of at least 10 percent and a recovery within 30 minutes of at least 90 percent from 50 percent deflection at 23° C as measured by ASTM D 1564-71.

Preferred as the fluoroaliphatic substance are fluoroaliphatic oligomers of the general formula

where
$R_f$ is a fluoroaliphatic radical,
R is a divalent orgainic radical,
Q is a linkage through which $R_f$ and R radicals are covalently bonded together,
A is a monovalent terminal organic radiacl or a valence bond interconnecting a Q-bonded R radical to another Q,
Q' is a linkage through which A and R are covalently bonded together,
m is an integer of at least 2, and can be as high as 25,
n and z are each integers not exceeding 30, and
neither product of mz nor nz exceeds 30.

The fluoroaliphatic radicals, $R_f$, are saturated, and generally monovalent aliphatic moieties. They can be straight chain, branched chain, and, if sufficiently large, cyclic, or combinations thereof, such as alkylcycloaliphatic radicals. The fluoroaliphatic skeletal chain can include catenary oxygen and/or trivalent nitrogen hetero atoms bonded only to carbon atoms, such hetero atoms providing stable linkages between fluorocarbon groups and not interfering with the inert character of the $R_f$ radical. While $R_f$ can have a large number of carbon atoms, $R_f$ radicals having not more than 20 carbon atoms will be adequate and preferred since larger radicals usually represent a less efficient utilization of fluorine than is possible with smaller $R_f$ radicals. $R_f$ should have at least three fully fluorinated carbon atoms, one of which is terminal, and should contain 40–78 weight percent carbon-bonded fluorine. Preferably $R_f$ has 6 to about 12 carbon atoms and contains 50–77 weight percent carbon-bonded fluorine. The terminal portion of the $R_f$ radical has preferably at least three fully fluorinated carbon atoms, e.g., $CF_3CF_2CF_2-$, and the preferred $R_f$ radical is substantially completely fluorinated, as in the case where $R_f$ is perfluoroalkyl, $C_nF_{2n+1}$.

These attributes of $R_f$ radicals of the fluoroaliphatic oligomer also apply to fluorinated radicals of useful foamstabilizing fluoroaliphatic substances which are not oligomers.

Either or both of R and Q of useful fluoroaliphatic oligomers may comprise solubilizing moieties. For example, R may comprise repeating oxyalkylene units and/or polyester groups and Q may comprise urethane linkages, as mentioned above. Likewise, such solubilizing moieties should provide 5 to 40 weight percent of the fluoroaliphatic oligomer.

The fluoroaliphatic oligomers used in the invention are generally non-ionic, normally liquid or low melting solids, being relatively low molecular weight linear polymers, branched polymers, or lightly crosslinked polymers, containing from 3 or 4 up to about 25 or 30 monomer units. Thus they are oligomeric, as contrasted to high polymers having molecular weight of 100,000 or higher. Preparation of such fluoroaliphatic oligomers is disclosed in U.S. Pat. No. 3,787,351 (Olson).

The pressure-sensitive adhesive tape of the invention is conveniently manufactured as disclosed in the aforementioned Canadian Pat. No. 747,341. In brief, the foamproducing mixture is coated onto a pressure-sensitive adhesive transfer tape, and either a similar transfer tape or a web having a low-adhesion surface is lightly pressed against the foam-producing coating. Preferably the pressure-sensitive adhesive layer of such transfer tape has been overcoated with a barrier or tie coating which serves to improve adhesion to the foam and to act as a barrier against substances tending to migrate from the foam into the adhesive. Foaming against the low-adhesion web and the pressure-sensitive adhesive coatings (or barrier coatings) produces dense skins.

More specifically, the viscous foam-producing batter mixture that is applied to a transfer tape may consist essentially of a mixture of isocyanate-terminated prepolymer, chain-extending agent, fluoroaliphatic substance, foam-generating agent and catalyst, together with flame retardant agent and other additives, if desired. The mixture is promptly coated over the adhesive layer or barrier coating of a transfer tape. To obtain a double-coated foam, a second transfer tape is added. Free foaming of the mixture occurs, together with further polymerization of the polyurethane, as the webs are drawn through a heating zone to provide a relatively thick and low-density foam layer. Upon leaving the heating zone, this warm and incompletely polymerized layer may, if desired, be gradually compressed to a relatively high bulk density foam layer having the desired ultimate thickness. Sufficient time is permitted thereafter for the polymerization reaction to be essentially completed so as to result in a stable cured foam layer integrally united to the adhesive coating or coatings.

The presently preferred pressure-sensitive adhesives are viscoelastic polyacrylates which inherently are aggressively tacky and highly cohesive. The polyacrylate is a copolymer of an alkyl acrylate having an average of 6 to 12 carbon atoms in the alkyl group and a small proportion (about 3 to 12%) of a copolymerizable monomer having a strongly polar functional group (such as acrylic acid, methacrylic acid, itaconic acid, acrylamide, methacrylamide, acrylonitrile, methacrylonitrile or mixtures thereof). A 90:10 copolymer of isooctyl acrylate and acrylic acid is exemplary. These copolymers are described in U.S. Pat. Nos. Re. 24,906 and 3,008,850. Internal cohesive strength and shear strength can be increased by crosslinking curing as described in U.S. Pat. Nos. 2,925,174 and 2,973,286.

The gasoline repellency of various polyurethane foams containing fluoroaliphatic substances was evaluated as follows. A series of open-cell foams were prepared from mixtures of by weight (a) 100 parts of an isocyanate prepolymer with an isocyanate number of about 450 (prepared from castor oil, phthalic anhydride and 80:20 tolylene diisocyanate as described in U.S. Pat. No. 2,921,916), (b) fluoroaliphatic substance in solution or solution-suspension as listed at the bottom of Table I, (c) 5.9 parts of glycerine crosslinking agent, (d) 4.24 parts of a poly(oxypropylene) diol of about 400 molecular weight (for example, Union Carbide PPG-424) as a chain-extending agent, (e) 0.4 part of diethyl-2-hydroxyethyl amine catalyst, (f) 0.2 part of stannous octoate catalyst and (g) 7.0 parts of CCl$_3$F blowing agent (E. I. duPont de Nemours Freon-11). After vigorous stirring for about 30 seconds, each mixture was applied between two polyethylene-coated paper webs. This was placed in an oven at about 80° C for about 10 minutes, removed, allowed to cool to room temperature, and the paper webs were removed, providing an open-cell foam about 6 mm in thickness. Where parts are indicated in connection with Table I and thereafter, "parts by weight" is intended; where molecular weight is indicated for a polymer, number average molecular weight is intended.

GASOLINE REPELLENCY TEST

Gasoline repellency was determined by positioning a freshly cut foam surface in a horizontal position, placing a drop of automotive gasoline on the cut surface, and measuring the time until the drop of gasoline had reached the level of the cut surface. Each time reported in Table I is an average of three determinations at three different locations separated by at least 2.5 cm.

F was a fluoroaliphatic carbodiimide oligomer of N-methyl perfluorooctanesulfonamidobutanol and tolylene diisocyanate of U.S. Pat. No. 3,896,251 in a 44% solution in methyl isobutylketone.

G was a mixture of 90 parts of (a) a copolymeric fluoroaliphatic oligomer of 35 parts N-methyl perfluorooctanesulfonamidobutyl methacrylate, 35 parts of N-methyl perfluorooctanesulfonamidobutyl methacrylate, 35 parts of N-methyl perfluorooctanesulfonamidoethyl methacrylate, 20 parts of a poly(oxytetramethylene) acrylate and 10 parts of butyl acrylate, and 10 parts of (b) a fluoroaliphatic carbodiimide of one mol of N-ethyl perfluorooctanesulfonamidoethanol and one mol of 80:20 tolylene diisocyanate, which mixture was in a 40% solution in CCl$_2$FCClF$_2$:methylisobutyl ketone :: 2:1.

H was a copolymeric fluoroaliphatic oligomer of 40 parts N-methyl perfluorooctanesulfonamidoethyl acrylate, 40 parts octadecyl methacrylate and 20 parts of poly(oxytetramethylene) acrylate of U.S. Pat. No. 3,787,351 in a 50% solution in methylisobutyl ketone.

I was a copolymeric fluoroaliphatic oligomer of (a) 45 parts N-methyl perfluorooctanesulfonamidoethyl acrylate, (b) 45 parts of a reaction product of one mol of N-methyl perfluorooctanesulfonamidoethanol, one mol of 2-hydroxypropyl methacrylate Table I

| Foam No. | Fluoroaliphatic Substance | Weight % of Oligomer provided by F | Weight % of Oligomer provided by Solubilizing Moieties | Parts of Fluoroaliphatic Substance in Foam | Foam Density (Kg/m$^3$) | Time (Minutes) |
|---|---|---|---|---|---|---|
| 1 | None | None | None | None | 300 | <0.02 |
| 2 | A | 61 | None | 0.2 | 270 | <0.02 |
| 3 | B | 34 | None | 0.4 | 270 | <0.02 |
| 4 | C | 26 | None | 0.12 | 220 | <0.1 |
| 5 | D | 52 | 20 | 0.5 | 220 | 0.2 |
| 6 | E | 44 | 10 | 0.4 | 220 | 0.5 |
| 7 | F | 44 | 17 | 0.5 | 270 | 0.5 |
| 8 | G | 30 | 18 | 0.4 | 300 | 3 |
| 9 | H | 21 | 19 | 0.5 | 270 | 3 |
| 10 | I | 41 | 10 | 0.4 | 240 | 3 |
| 11 | J | 37 | 19 | 0.5 | 240 | 3.5 |
| 12* | J$_1$ | 37 | 19 | 0.5 | 240 | 3.5 |

*Amount of poly(oxypropylene)diol reduced to 3.44 parts to compensate for added hydroxyl content provided by the poly(oxypropylene glycol)triol.

A was a fluoroaliphatic oligomer of 1,1-dihydroperfluorooctyl methacrylate of U.S. Pat. No. 2,803,615 in a 2% solution in xylene hexafluoride.

B was a copolymeric fluoroaliphatic oligomer of 65 parts N-methyl perfluorooctanesulfonamidoethyl methacrylate and 35 parts octadecyl methacrylate of U.S. Pat. No. 2,803,615 in a 40% solution in 1,1,1-trichloroethane.

C was a copolymeric fluoroaliphatic oligomer from the same starting materials as B except a 1:1 ratio of reactants was used and it was employed in a 25% solution in n-heptane.

D was the reaction product of 2 mols of N-ethyl perfluorooctanesulfonamidoethanol and one mol of 80:20 tolylene diisocyanate of U.S. Pat. No. 3,398,182 in a 33% solution-suspension in methylisobutyl ketone.

E was a 1:1 mixture of B and D in a 20% solution in CCl$_2$FCClF$_2$:2-ethoxyethanol:tetrahydrofuran :: 7:3:1.

and one mol of 80:20 tolylene diisocyanate, and (c) 10 parts of butyl acrylate in a 20% solution in CCl$_2$FCClF$_2$:methyl isobutyl ketone :: 1:1.

J was a copolymeric fluoroaliphatic oligomer of 70 parts N-methyl perfluorooctanesulfonamidoethyl acrylate, 20 parts poly(oxytetramethylene) acrylate, and 10 parts butyl acrylate in a 50% solution in methylisobutyl ketone.

J$_1$ was Oligomer J in a 20% solution-suspension in 1500 molecular weight poly(oxypropylene) triol.

Results reported in Table I show that a fluoroaliphatic substance may not improve the gasoline repellency of polyurethane foam if it lacks solubilizing moieties (as in Fluoroaliphatic Oligomers A and B) or may provide an insignificant improvement (as does Fluoroaliphatic Oligomer C). Hence, Fluoroaliphatic Oligomers A, B and C are not useful in the present invention in the absence of an appreciable amount of a much more soluble fluoroaliphatic substance. Fluoroaliphatic Substance D would be of submarginal utility, apparently not being sufficiently soluble in the polyurethane to afford good repellency to gasoline, its solubility being limited by its high fluorine content. Fluoroaliphatic Substances E–J, having a suitable balance of solubilizing and insolubilizing moieties for this particular polyurethane foam, were indicated to be useful for the purposes of the invention, and superior in the case of Fluoroaliphatic substances G–J.

Foam No. 13

Foam No. 13 was prepared in the same manner as Foam No. 12 except that 0.5 part of water was used in place of the $CCl_3F$ blowing agent. Foam No. 13 was open-cell, had a density of 130 kg/m³ and had a value of 3.5 minutes in the above-described Gasoline Repellency Test.

Foams No. 14–18

A series of foams of the formulations given in parts by weight in Table II was made by weighing the ingredients (60 g of mixture) into a plastic-coated 6-ounce (180 cm³) paper cup, stirring vigorously for 30 seconds, then placing in an oven at about 80° C for about 10 minutes. In each case a good foam of about 450 kg/m³ density was obtained which had raised out of the cup.

The cooled foam was sliced to expose a cut surface of cells, and gasoline repellency was determined as in the Gasoline Repellency Test described above except that the time recorded was that required for the gasoline to essentially disappear (i.e., no light reflection from a liquid surface). The values given in Table III are averages of three determinations.

described above using a transfer tape as described in the Example of Canadian Pat. No. 747,341 (i.e., 90:10 isooctyl acrylate: acrylic acid adhesive and butadiene-styrene copolymer barrier coat). The foam of Tape M was prepared in the same way as Foam No. 12 except containing a lower proportion (0.2 part) of the Fluoroaliphatic Oligomer $J_1$ which is a copolymer of fluoroaliphatic poly(oxyalkylene) acrylate and fluorine-free hydrocarbon acrylate. Tape L was identical to Tape M except it included no fluoroaliphatic substance. Each of Tapes L and M had an overall thickness of 1.7 mm (exclusive of the disposable webs). Tests on Tapes L and M are reported in Table IV.

Table IV

|  | Tape L | Tape M |
|---|---|---|
| Foam density (kg/m³) | 190 | 340 |
| Compression at 2 N/cm² (ASTM D 1564-71) | 18% | 13% |
| Resilience, 50% deflection at 23° C (ASTM D 1564-71) | 98% | 98% |
| Tensile strength (measured normal to surface) N/cm² | 53 | 68 |
| Peel strength in N/100 mm (180°) | 72 | 60 |
| Gasoline repellency in minutes (as tested in Table I) | <0.02 | 1.0 |

Table II

| | | Parts by weight | | | |
|---|---|---|---|---|---|
| Foam No. | 14 | 15 | 16 | 17 | 18 |
| Isocyanate prepolymer<sup>a</sup> | 100.0 | 100.0 | 100.0 | 100.0 | 100.0 |
| $CCl_3F$ blowing agent | 7.0 | 7.0 | 7.0 | 7.0 | 7.0 |
| Fluoroaliphatic additive<sup>b</sup> | — | 0.34 | 0.62 | 1.56 | 3.12 |
| Silicone surfactant<sup>c</sup> | 1.3 | 1.3 | 1.3 | 1.3 | 1.3 |
| Glycerine | 5.9 | 5.9 | 5.9 | 5.9 | 5.9 |
| Diol<sup>d</sup> | 4.24 | 4.02 | 3.82 | 3.18 | 2.12 |
| Diethyl-2-hydroxyethyl amine | 0.8 | 0.8 | 0.8 | 0.8 | 0.8 |
| Stannous octoate | 0.2 | 0.2 | 0.2 | 0.2 | 0.2 |

<sup>a</sup>An isocyanate prepolymer having an isocyanate number of about 450 prepared from 42 parts tolylene diisocyanate and 100 parts of a 1500 molecular weight poly(oxypropylene)triol based on glycerine.
<sup>b</sup>Fluoroaliphatic Oligomer J except as a 32 weight percent solution-suspension in a 400 molecular weight poly(oxypropylene) diol.
<sup>c</sup>Poly(dimethylsiloxane), viscosity 50 centistokes (Dow Corning DC-200).
<sup>d</sup>400 molecular weight poly(oxypropylene)diol.

Table III

| Foam No. | 14 | 15 | 16 | 17 | 18 |
|---|---|---|---|---|---|
| Weight percent of Foam of Fluoroaliphatic Oligomer J | 0 | 0.1 | 0.2 | 0.5 | 1.0 |
| Gasoline repellency (minutes) | <0.02 | 3 | 3.5 | 4.5 | 8.5 |

EXAMPLE 1

Two double-coated pressure-sensitive adhesive open-cell foam tapes (Tapes L and M) were prepared as

EXAMPLE 2

Two single-coated pressure-sensitive adhesive foam tapes (Tapes N and O) were made in the same manner as described in Example 1 except that polyethylene-coated paper was substituted for one of the transfer tapes and the mixtures of foam producing batter were as indicated below.

|  | Tape N (parts) | Tape O (parts) |
|---|---|---|
| Premixture of 25.55 parts of poly(oxypropylene) diol of 2000 molecular weight, 24 parts of 1500 molecular weight poly(oxypropylene) triol based on glycerine, 43.65 parts of kaolin clay (Huber "Hi-White"), 5 parts of color paste of one part carbon black in 4 parts of poly(oxypropylene)diol of 2000 | | |

| | Tape N (parts) | Tape O (parts) |
|---|---|---|
| molecular weight, 0.4 part antioxidant (butylated hydroxytoluene), 0.3 part process stabilizer (calcium 2-ethylhexanoate), 0.1 part UV stabilizer and 1.0 part viscosity control agent (Thixcin E of Baker Castor Oil Co.) | 100.0 | 100.0 |
| Stannous octoate | 1.0 | 1.0 |
| 2-ethoxyethanol | 0.5 | 0.5 |
| Fluoroaliphatic Oligomer $J_1$ | — | 1.0* |
| Isocyanate prepolymer prepared from 66.1 parts of tolylene diisocyanate, 17.73 parts of poly(oxypropylene)diol of 2000 molecular weight, and 16.17 parts of tripropylene glycol | 15.9 | 15.9 |
| $CCl_3F$ blowing agent | 8.0 | 8.0 |

*5.0 parts of the 20% solution-suspension of Table I

After foaming, both Tapes N and O had overall thicknesses of about 6 mm and densities of 160 kg/m³. Tapes N and O exhibited water take-up of 44% and 77%, respectively, indicating that only the foam of Tape O had essentially open-cell structure as a consequence of its fluoroaliphatic oligomer content. Tape O passed the Water Barrier Test described below, while Tape N failed within a few minutes.

WATER BARRIER TEST

A tape 1.27 cm in width is adhered by its own adhesive to a glass plate in the shape of a U with the legs of the U spaced about 10 cm. The tape is compressed by a second glass plate to 70% of its original thickness (30% compression). A 5.0-cm static head of water is placed in the U. If no water leaks through in less than one hour, the foam tape is considered to be effective as a water barrier.

EXAMPLE 3

Two single-coated pressure-sensitive adhesive foam tapes (Tapes P and Q) were made as in Example 2 except that each premixture contained 0.5 part phenylmercuric acetate as catalyst, 0.5 part of silicone surfactant [a polydimethylsiloxane-poly(alkyleneoxide) copolymer (Dow-Corning DC-190)], no stannous octoate and no $CCl_3F$. Also the amount of the Fluoroaliphatic Oligomer $J_1$ (used only in making Tape Q) was reduced (as compared to Tape O) to 0.5 part, and 0.8 part water was used as the blowing agent with enough additional isocyanate terminated prepolymer (about 8.0 parts) to react with the water. Both Tapes P and Q had an overall thickness of about 6 mm and a density of 160 kg/m³.

Tape P which included no fluoroaliphatic oligomer failed the Water Barrier Test within a few minutes, whereas Tape Q passed. In the Gasoline Repellency Test Tapes P and Q exhibited values of <0.02 and 2.5 minutes, respectively.

Foam No. 19

A foam essentially the same as that of Tape Q, except that the fluoroaliphatic oligomer level was about 4 weight percent of the foam, was tested for repellency to a variety of chemicals using the procedure described for the Gasoline Repellency Test. Excellent repellency (5 minutes or more for a drop of the liquid to disappear, i.e., no light reflection) was obtained for each of isopropyl alcohol, propylene glycol, 1,4-butanediol, heptane, methyl ethyl ketone, toluene, 2-ethylhexanoic acid, ethyl acetate, dibutylamine and poly(dimethylsiloxane). The only liquid tested that was rapidly absorbed was $CCl_2FCClF_2$ (Freon 113 of E. I. duPont). A drop of each of these liquids on a similar foam except for omission of the fluoroaliphatic oligomer was absorbed in about one second or less.

I claim:

1. Pressure-sensitive adhesive tape having an open-cell polyurethane foam backing and incorporating in the polyurethane a foam-stabilizing fluoroaliphatic substance containing covalently bonded (a) a plurality of fluoroaliphatic radicals having at least three fully fluorinated carbon atoms, one of which is terminal, and (b) at least one moiety similar in structure to a moiety of the polyurethane, said solubilizing moieties providing 5 to 40 weight percent and carbon-bonded fluorine providing 10 to 45 weight percent of the fluoroaliphatic substance, the fluoroaliphatic substance being free of functional groups containing active hydrogen atoms and being present in an amount affording repellency to gasoline.

2. Pressure-sensitive adhesive tape as defined in claim 1 wherein the fluoroaliphatic substance provides 0.02 to 10 weight percent of the polyurethane foam backing.

3. Pressure-sensitive adhesive tape as defined in claim 1 wherein the polyurethane is a polyether polyurethane and said solubilizing moieties are predominately repeating oxyalkylene units having on the average 2.5 to 4 carbon atoms.

4. Pressure-sensitive adhesive tape as defined in claim 1 wherein the polyurethane is a polyester polyurethane and said solubilizing moieties are predominately polyester groups.

5. Pressure-sensitive adhesive tape as defined in claim 1 wherein said solubilizing moieties are predominately urethane linkages.

6. Pressure-sensitive adhesive tape as defined in claim 1 wherein fluorine provides 20–40 weight percent and said solubilizing moieties provide 10–25 weight percent of the fluoroaliphatic substance.

7. Double-coated pressure-sensitive adhesive tape as defined in claim 1.

8. Single-coated pressure-sensitive adhesive tape as defined in claim 1.

9. Pressure-sensitive adhesive tape having an open-cell polyurethane foam backing with dense skins, a pressure-sensitive adhesive layer united to one or both skins, and incorporating in the polyurethane one or more foam-stabilizing fluoroaliphatic oligomers of the general formula:

where
- $R_f$ is a fluoroaliphatic radical having at least three fully fluorinated carbon atoms, one of which is terminal,
- R is a divalent organic radical,
- Q is a linkage through which $R_f$ and R radicals are covalently bonded together,
- A is a monovalent terminal organic radical or a valence bond interconnecting a Q-bonded R radical to another Q,
- Q' is a linkage through which A and R are covalently bonded together,
- m is an integer of at least 2,
- n and z are integers not exceeding 30, and
- the products mz and nz do not exceed 30,
- R and Q together comprise solubilizing moieties providing 5 to 40 weight percent of total oligomer,
- carbon-bonded fluorine provides 10 to 45 weight percent of total oligomer, and
- the fluoroaliphatic oligomer is free of functional groups containing active hydrogen atoms and is present in an amount affording repellency to gasoline.

10. Pressure-sensitive adhesive tape as defined in claim 9 wherein the polyurethane is a polyether polyurethane and said solubilizing moieties are provided by repeating oxyalkylene units having on the average 2.5 to 4 carbon atoms in R.

11. Pressure-sensitive adhesive tape as defined in claim 9 wherein the polyurethane is a polyester polyurethane and said solubilizing moieties are provided by polyester groups in R.

12. Pressure-sensitive adhesive tape as defined in claim 9 wherein said solubilizing moieties are provided by urethane linkages in Q.

13. Presure-sensitive adhesive tape as defined in claim 9 wherein carbon-bonded fluorine provides 20–40 weight percent and said solubilizing moieties provide 10–25 weight percent of total oligomer.

14. Pressure-sensitive adhesive tape as defined in claim 9 wherein there is a single fluoroaliphatic oligomer which is a copolymer of fluoroaliphatic poly(oxyalkylene) acrylate and fluorine-free hydrocarbon acrylate in an amount providing 0.1–2.0 weight percent of the foam backing.

* * * * *